(12) United States Patent
Liu et al.

(10) Patent No.: US 9,183,200 B1
(45) Date of Patent: Nov. 10, 2015

(54) SCALE UP DEDUPLICATION ENGINE VIA EFFICIENT PARTITIONING

(75) Inventors: Danzhou Liu, Blaine, MN (US); Haibin She, Beijing (CN); Haigang Wang, Beijing (CN)

(73) Assignee: Symantec Corporation, Mountain View, CA (US)

( * ) Notice: Subject to any disclaimer, the term of this patent is extended or adjusted under 35 U.S.C. 154(b) by 152 days.

(21) Appl. No.: 13/564,984

(22) Filed: Aug. 2, 2012

(51) Int. Cl.
G06F 17/30 (2006.01)

(52) U.S. Cl.
CPC .... *G06F 17/30008* (2013.01); *G06F 17/30286* (2013.01); *G06F 17/30339* (2013.01)

(58) Field of Classification Search
CPC ............ G06F 17/30156; G06F 3/0641; G06F 17/30339; G06F 17/30286; G06F 17/30008
USPC .................. 707/692, 968, 972, 648, 682, 703
See application file for complete search history.

(56) References Cited

U.S. PATENT DOCUMENTS

| | | | | |
|---|---|---|---|---|
| 5,696,967 A * | 12/1997 | Hayashi et al. | ................. | 714/20 |
| 5,745,750 A * | 4/1998 | Porcaro | ................... | 1/1 |
| 5,907,848 A * | 5/1999 | Zaiken et al. | ......................... | 1/1 |
| 6,192,365 B1 * | 2/2001 | Draper et al. | ................ | 707/648 |
| 6,240,428 B1 * | 5/2001 | Yeung et al. | ......................... | 1/1 |
| 6,317,787 B1 * | 11/2001 | Boyd et al. | ..................... | 709/224 |
| 6,353,828 B1 * | 3/2002 | Ganesh et al. | ........................ | 1/1 |
| 6,732,124 B1 * | 5/2004 | Koseki et al. | ......................... | 1/1 |
| 7,778,979 B2 * | 8/2010 | Hatonen et al. | ............... | 707/693 |
| 8,326,897 B2 * | 12/2012 | Butterworth et al. | .......... | 707/822 |
| 8,521,699 B2 * | 8/2013 | Kureshy et al. | ............... | 707/687 |
| 2006/0004840 A1 * | 1/2006 | Senda | ........................ | 707/102 |
| 2006/0020634 A1 * | 1/2006 | Huras et al. | .................... | 707/200 |
| 2006/0047713 A1 * | 3/2006 | Gornshtein et al. | ........... | 707/202 |
| 2010/0049715 A1 * | 2/2010 | Jacobsen et al. | ................... | 707/8 |
| 2010/0082529 A1 * | 4/2010 | Mace et al. | ...................... | 707/609 |
| 2010/0088354 A1 * | 4/2010 | Wu et al. | ........................ | 707/827 |
| 2010/0146008 A1 * | 6/2010 | Jacobsen et al. | ............... | 707/802 |
| 2010/0205157 A1 * | 8/2010 | Hanus et al. | ................... | 707/690 |
| 2012/0254269 A1 * | 10/2012 | Carmichael | ................... | 707/827 |
| 2012/0323924 A1 * | 12/2012 | Okun | ........................... | 707/741 |
| 2013/0066888 A1 * | 3/2013 | Kureshy et al. | ............... | 707/752 |
| 2013/0166438 A1 * | 6/2013 | Theado et al. | .................. | 705/39 |
| 2013/0290263 A1 * | 10/2013 | Beaverson et al. | ........... | 707/649 |
| 2013/0318106 A1 * | 11/2013 | Shepard et al. | ............... | 707/754 |
| 2013/0332435 A1 * | 12/2013 | Bernstein et al. | .............. | 707/703 |

* cited by examiner

*Primary Examiner* — Shahid Alam
*Assistant Examiner* — Nargis Sultana
(74) *Attorney, Agent, or Firm* — Campbell Stephenson LLP

(57) ABSTRACT

An efficient partitioning scheme is provided to improve efficiency of updating a reference list database of a deduplication engine. Transaction objects of a transaction log can be divided into a number of partitioned log files, based on criteria. The transaction objects within each partitioned log file are then sorted in parallel, while maintaining time order of the transaction objects. The present disclosure also provides for dividing database records of a reference list database into multiple tables, such as a master database table and a number of child database tables. The efficient partitioning scheme also provides for processing the transaction objects of each partitioned log file against a respective child table of the reference list database in parallel, such as by updating temporary child tables with information from the transaction objects in parallel. The temporary database tables then replace (the previous version of) the reference list database tables.

20 Claims, 8 Drawing Sheets

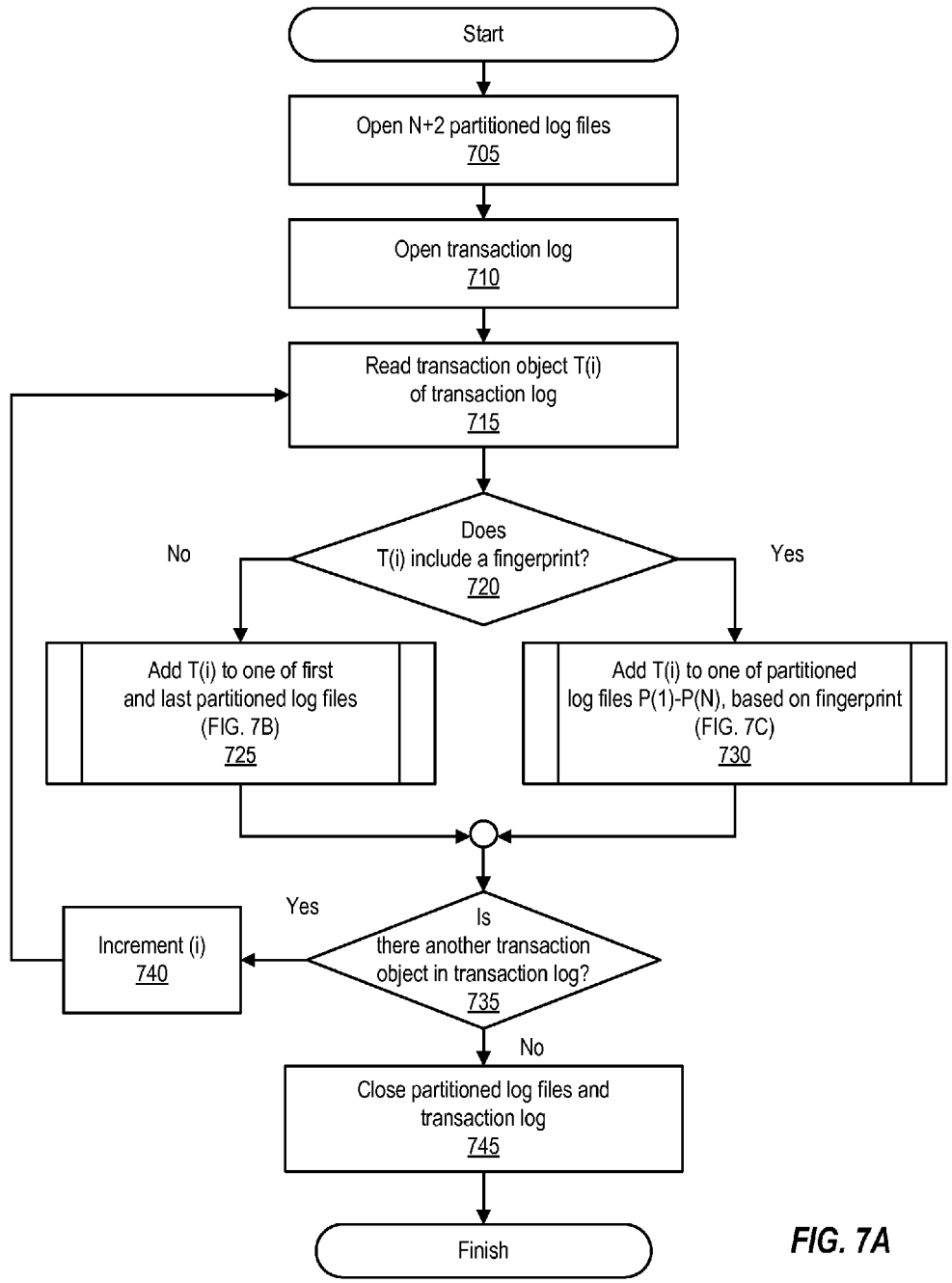

SCALE UP DEDUPLICATION ENGINE VIA EFFICIENT PARTITIONING

FIELD OF THE INVENTION

This invention relates to improving efficiency of updating a reference list database (e.g., transaction queue processing) by a deduplication engine, and more particularly, to an efficient partitioning scheme for transaction queue processing.

DESCRIPTION OF THE RELATED ART

An ever-increasing reliance on information and computing systems, which produce, process, distribute, and maintain data in its various forms, continues to put great demands on techniques for providing data storage and access to that data storage. While data growth is not new, the pace of data growth has become more rapid, the location of data more dispersed, and linkages between data sets more complex. Various organizations that produce and retain large amounts of data must protect and backup such data. However, creating backup images of such data requires a significant amount of network resources. Data deduplication offers efficient and storage-optimized data protection for organizations.

BRIEF DESCRIPTION OF THE DRAWINGS

The present invention may be better understood, and its numerous objects, features and advantages made apparent to those skilled in the art by referencing the accompanying drawings.

FIGS. 7A, 7B, and 7C are flowcharts illustrating an example transaction log partitioning process implemented by a partitioning module, according to one embodiment.

Figure 1:
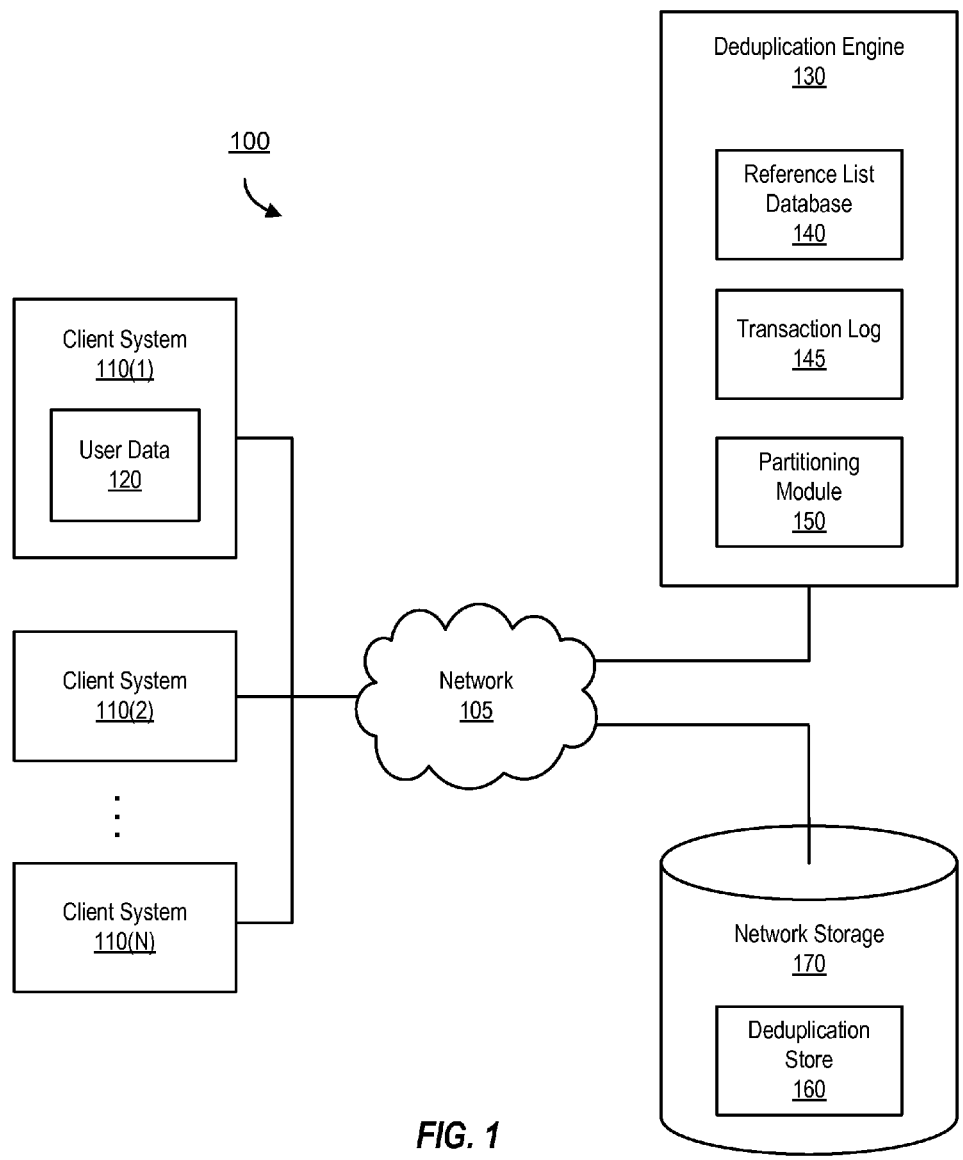
FIG. 1 is a simplified block diagram illustrating components of an example deduplication system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

During a deduplication process, a deduplication engine stores non-duplicative data, or unique data, in a deduplication store. In other words, the deduplication engine stores data once in the deduplication store, even if the data is stored in multiple locations within an enterprise system. A deduplication engine also records a corresponding transaction object that describes the unique data (e.g., the storing of the unique data is a transaction) in a transaction queue. The transaction object is a record that includes information about the unique data, such as a fingerprint corresponding to the unique data and a location of where the unique data can be found in the deduplication store. A transaction object can thus indicate that the reference list database should be updated with the information of the transaction object (e.g., adding a database record containing the information of the transaction object to a reference list database). Periodically (e.g., twice a day), the deduplication engine processes the transaction queue, which is referred to herein as queue processing. Traditionally, the deduplication engine processes the transaction queue by sequentially traversing through each transaction object in the transaction queue and processing each transaction object against the reference list database (e.g., adding a database record to the reference list database that corresponds to the transaction object, where the database record contains a fingerprint and a location that correspond to the unique data described by the transaction object). However, as the number of fingerprints grows, queue processing takes longer to complete (e.g., adding 500 million segment fingerprints to the reference list database can take more than 24 hours to complete). While multiple processors can be added to a deduplication engine to handle the growing amount of work (e.g., deduplication jobs) in the deduplication system, sequential queue processing underutilizes most of those processors.

The present disclosure provides for improving the efficiency of queue processing by implementing an efficient partitioning scheme that partitions the transaction queue and performs queue processing in parallel (rather than sequentially), also referred to as parallel queue processing. The present disclosure provides for partitioning the transaction queue, or dividing transaction objects recorded in a transaction log into a number of partition files, based on criteria (e.g., fingerprints). In one embodiment, the transaction objects that involve the criteria are sorted into multiple partitioned log files, where the partitioned log files each cover a different range of the criteria (e.g., three partition files that respectively cover three ranges of fingerprints starting with hexadecimal values between 0-4, between 5-9, and between a-f). The transaction objects within each partitioned log file are then sorted by the criteria (e.g., sorted in increasing order of fingerprint values), while maintaining the original time order of the transaction objects. There being multiple partitioned log files, the sorting of the partitioned log files can be performed in parallel. This can be accomplished, for example, by having each partitioned log file assigned to a corresponding thread that can be executed in parallel (also referred to as executing concurrently) with other such threads executing sorting operations.

The present disclosure also provides for partitioning the reference list database, or dividing the database records of the reference list database into multiple tables, such as a master database table and a number of child database tables. The child database tables also each cover a different range of criteria (e.g., three child tables that respectively cover three ranges of fingerprints starting with hexadecimal values between 0-4, between 5-9, and between a-f). The database records within each child database table fall within the respective range of criteria, and preferably, are maintained in sorted order.

The present disclosure also provides for updating child tables of the partitioned reference list database in parallel (rather than sequentially) as part of parallel queue processing, also referred to as parallel database updating. In one embodiment, a dump file (e.g., flat file) is generated for each child database table, where the dump file includes the data stored in the respective child database table without the database structure (e.g., fields of each database record of the child database table are listed in a row of a text file, separated by delimiters). The generating of dump files can be performed in parallel. This can be accomplished, for example, by assigning each of the child tables to a corresponding thread that can be executed in parallel (also referred to as executing concurrently) with other such threads executing generation operations.

Each dump file is then merged with one or more respective partitioned log files to produce a merged dump file. A respective partitioned log file can be merged with a respective dump file when the respective partitioned log file shares at least a portion of the same criteria range associated with the respective dump file (e.g., a dump file of a child database table that covers fingerprint range 0-4 is merged with a partitioned log file that also covers at least a portion of fingerprint range 0-4). Each respective merged dump file can be produced by updating a respective dump file with the information of the transaction objects in the partitioned log file (e.g., add new database records or rows to the respective dump file, add or remove a reference data object from reference list of existing database records or rows of the respective dump file, or remove existing database records or rows from the respective dump file). The merging of dump files with respective partitioned log files can be performed in parallel. This can be accomplished, for example, by assigning a respective one of the dump files and a respective one of the partitioned log files to a corresponding thread that can be executed in parallel (also referred to as executing concurrently) with other such threads executing merging operations.

Each of the merged dump files is then imported into a respective temporary child database table. The importing of merged dump files into respective temporary child database tables can be performed in parallel. This can be accomplished, for example, by having each merged dump file and corresponding temporary child database table assigned to a corresponding thread that can be executed in parallel (also referred to as executing concurrently) with other such threads executing import operations. The temporary database tables then replace (the previous version of) the reference list database tables.

The number of threads implemented in the present disclosure can be made to depend on the number of processors (e.g., CPU cores and/or physical servers) implemented in the deduplication engine, where processors can be added as the deduplication system grows (e.g., multiple deduplication clients are added to the system, which increases the amount of work for the deduplication engine). For example, if three processors are implemented, three (or more) threads can be executed. Thus, efficiency of queue processing can be improved, where the improvement is proportional to the number of parallel threads implemented (e.g., queue processing is four times faster using four parallel threads).

EXAMPLE EMBODIMENTS

FIG. 1 is a simplified block diagram illustrating components of an example deduplication system 100 in which the present disclosure can be implemented. Deduplication system 100 includes a network 105 that communicatively couples one or more client systems 110(1)-(N), a deduplication engine 130, and network storage 170. Each component is discussed in further detail below.

One or more client systems 110(1)-(N), also referred to herein as client devices 110 and/or clients 110, can be implemented using, for example, a desktop computer, a laptop computer, a workstation, a server, or the like. An example of such computing devices is described subsequently, in connection with FIG. 8. One or more clients 110(1)-(N) can be configured to communicate with deduplication engine 130 via network 105. An example of network 105, which can be used by clients 110(1)-(N) to access deduplication engine 130, is a local area network (LAN) utilizing Ethernet, IEEE 802.11x, or some other communications protocol. While FIG. 1 illustrates client system 110(1) including user data 120, each client system can store different user data 120 in storage local to the client system.

User data 120 can include various data that is generated and/or consumed by applications employed by a user of client system 110(1). User data 120 can also include executable files, such as those used to implement applications and operating systems, as well as files that are used or generated by such executable files. User data 120 can include files generated by user applications (e.g., word processing programs, email programs, graphics programs, a database application, or the like) executing on client 110(1). Some of user data 120 may also be transferred to deduplication engine 140 via a network 105 for inclusion in deduplication store 160 (e.g., stored as part of a backup image in deduplication store 160). Each client 110 can send different user data 120 to deduplication engine 140.

Deduplication engine 130 is also coupled to network 105 and can be configured to perform a variety of tasks related to management and implementation of deduplication services for the system illustrated in FIG. 1. Deduplication engine 130 can include one or more nodes (e.g., content routers, processors, CPU cores, physical servers) configured to perform a variety of tasks related to deduplication services. For example, deduplication engine 130 can provide deduplication services for eliminating duplicated data content in a backup context. Deduplication services help reduce an amount of storage needed to store backups of enterprise data (e.g., user data 120) by providing a mechanism for storing a piece of information only once. Thus, in a backup context, if a piece of information (e.g., a data item) is stored in multiple locations within an enterprise (e.g., on multiple client systems 110), that piece of information will only be stored once in a deduplicated backup storage area, such as deduplication store 160. Also, if the piece of information does not change between a first point in time (e.g., a first backup image or a first version of a file) and a second point in time (e.g., a second backup image or a second version of a file), then that piece of information need not (and, in fact, will not) be stored during a second backup process, as long as that piece of information continues to be stored in the deduplicated backup storage area. Data deduplication can also be employed outside of the backup context, thereby reducing the amount of active storage occupied by duplicate files or data.

Deduplication services can be implemented in deduplication system 100 as a client-server application (not shown), with a server component (e.g., residing on deduplication engine 130) and a client component (e.g., residing on client 110) of the client-server application. Certain functions of the deduplication services can be performed by the client and server components, where the functions may be divided between the two components, or may be performed completely by one component or the other, depending on the implementation of the backup application.

Client 110 and deduplication engine 130 can be configured to communicate with each other (e.g., via client and server components) during a deduplication process. Deduplication engine 130 can be configured to store only one copy of user data in deduplication store 160. Rather than compare a data item (e.g., a file or a file segment of user data) itself to each data item stored in deduplication store 160 (which can be enormously time- and processing-prohibitive), deduplication engine 130 uses fingerprints to determine whether a given data item is already stored in deduplication store 160.

For example, during a deduplication process for storing user data 120 in deduplication store 160, a client component of the deduplication services can be configured to generate metadata about user data 120, such as one or more identifiers, or fingerprints, that can identify different data items (e.g., files or file segments) of user data 120. The client component can also be configured to communicate the metadata (e.g., a list of fingerprints) to a server component of deduplication engine 130. Deduplication engine 130 can compare the received fingerprints to fingerprints stored in a metadata database (not shown) on deduplication engine 130 or in network storage 170. A metadata database stores a respective fingerprint for all unique data items stored in deduplication store 160. Deduplication engine 130 can use the fingerprints to determine if the different data items of user data 120 are already stored in deduplication store 160, where only non-duplicative portions of user data 120 are stored in deduplication store 160.

A metadata database can also store various metadata about deduplicated data, such as information about files (e.g., file name, file path, file attributes, fingerprints), stored in deduplication store 160. Since only single instances of the portions of a file are stored in deduplication store 160, a metadata database can provide a mapping of a file to the various non-duplicative portions stored in deduplication store 160 that compose the file. Thus, a single file can be associated with multiple portions stored throughout deduplication store 160, and multiple files can be associated with a single portion (e.g., the multiple files share the single portion).

In this example, fingerprints generated on a client (e.g., generated by a deduplication client component on a given one of client systems 110) are transmitted to deduplication engine 130 without also transmitting the data items (e.g., segments or files) themselves to deduplication engine 130. In an alternative example, a client system such as one of client systems 110 can transmit the data items to deduplication engine 130, and deduplication engine 130 can use the same fingerprint-generation technique to generate fingerprints for the data items. However, in such an alternative example, server-side fingerprint generation can consume a greater amount of network resources (e.g., bandwidth) and processing resources (e.g., a processor of deduplication engine 130), as compared to client-side fingerprint generation.

Deduplication engine 130 is coupled to network storage 170 for deduplicated data that includes deduplication store 160. Deduplication store 160 is a storage area in which deduplicated data can be stored. Deduplication store 160 can be configured as single instance storage. In single instance storage, only a single instance of a piece of data is stored. A common use of single instance storage is the maintenance of data backups for servers and other computing clients in a network. A single instance of information duplicated in deduplication system 100 can be stored in the single instance storage area.

Reference list database 140 can be stored on deduplication engine 130. Once deduplication engine 130 has evaluated metadata received from client 110 (e.g., a list of fingerprints) to determine that data items of user data 120 are non-duplicative of the data already stored in deduplication store 160 and thus should be added to deduplication store 160, deduplication engine 130 can request the non-duplicative data items (or unique data items) by identifying each unique data item using the item's associated fingerprint. As the unique data items are received from client 110, deduplication engine 130 can write the unique data items into a fixed-size container located in memory of deduplication engine 130, such as a cache. Once the container is full, the entire container is written to a location in deduplication store 160.

As each unique data item is stored at deduplication store 160, deduplication engine 130 records each transaction (e.g., each occurrence of storing a unique data item) as a transaction object in a transaction log 145, which can be stored at deduplication engine 130. Each transaction object is a record that includes information describing a respective unique data item. For example, a transaction object can include a corresponding identifier (e.g., fingerprint) of the unique data item and a location of the unique data item (e.g., an identifier of a container that includes the unique data item).

Partitioning module 150 can be implemented in deduplication engine 130 to perform queue processing in parallel (e.g., parallel queue processing) and improve the efficiency and scalability of queue processing. Partitioning module 150 can be configured to partition a transaction log into multiple partition files, or partitioned log files. Partitioning module 150 can partition the transaction log by assigning each transaction object of the transaction log to one of the partitioned log files, where each partitioned log file covers a particular range of criteria (e.g., a range of fingerprint values). Partitioning module 150 can also be configured to start multiple processing threads and assign each of the partitioned log files to one of the threads. In parallel, each thread sorts a respective partitioned log file by criteria (e.g., by fingerprint value). In one embodiment, such as in a multi-node environment, deduplication engine 130 can include multiple nodes, where partitioning module 150 starts one or more threads to perform the sorting on each node. As will be appreciated, other criteria (e.g., check sums, hash values, and the like) can also be used for such sorting and are intended to be included in the scope of the present disclosure.

Partitioning module 150 can also be configured to partition a (non-partitioned) reference list database into a partitioned reference list database that includes multiple child tables, where each child table covers a particular range of criteria (e.g., a range of fingerprint values). In one embodiment (e.g., a multi-node environment), deduplication engine 130 can include multiple nodes, where each node can be responsible for storing a portion of a reference list database, such as a one or more database tables that cover a given criteria range (e.g., fingerprint range).

Once a reference list database is partitioned into multiple child tables, partitioning module 150 can be configured to update each child table with information from the partitioned log files, in parallel (e.g., parallel database updating). To do so, partitioning module 150 starts multiple processing threads and assigns each of the child tables to one of the threads.

Alternatively, child tables can be assigned to threads in groups (with two or more child tables assigned to one or more threads), or some combination thereof. In one embodiment, such as in a multi-node environment, deduplication engine 130 can include multiple nodes, where partitioning module 150 starts one or more threads to perform parallel database updating on each node. Child tables (e.g., on one or more nodes) that do not need to be updated (e.g., no transaction objects correspond to the child tables) can be skipped during parallel database updating.

In parallel, each thread generates a dump file (e.g., a flat file) of the respective child table. Partitioning module 150 can also be configured to assign each of the sorted partitioned log files to a respective thread, where each of the sorted partitioned log files share at least a portion of the same range of criteria with the respective dump file (e.g., both a dump file and one or more partitioned log files cover the same fingerprint range). In parallel (e.g., concurrent execution), each thread merges a dump file with a sorted partitioned log file to produce a merged dump file. In parallel (e.g., concurrent execution), each thread imports the merged dump file into a respective updated temporary child table. Partitioning module 150 can replace the partitioned reference list database with the updated partitioned reference list database, such as by replacing the existing child tables with the updated temporary child tables (e.g., by dropping or deleting the existing child tables and renaming the temporary updated child tables to replace the dropped child tables).

Deduplication store 160 can be stored in network storage 170. Network storage 170 can be implemented as network attached storage (NAS), file servers, storage filers, and/or network shares. Network storage 170 can be implemented as a single storage device or as a collection of storage devices. Network storage 170 can also be implemented as a storage area network (SAN), which couples remote storage devices to a server (e.g., a storage server), such that the remote storage devices appear as locally-attached storage devices to the server's operating system (OS), for example. Network storage 170 can be directly attached to deduplication engine 140 or can be coupled to deduplication engine 140 via network 105. Network storage 170 can include a data volume or other storage construct.

In light of the present disclosure, it will be appreciated that network storage 170 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, a larger number of client systems 110(1)-(N) can be implemented in the deduplication system 100 than the number shown, client systems 110(1)-(N) can be directly coupled to deduplication engine 130 and/or network storage 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2:
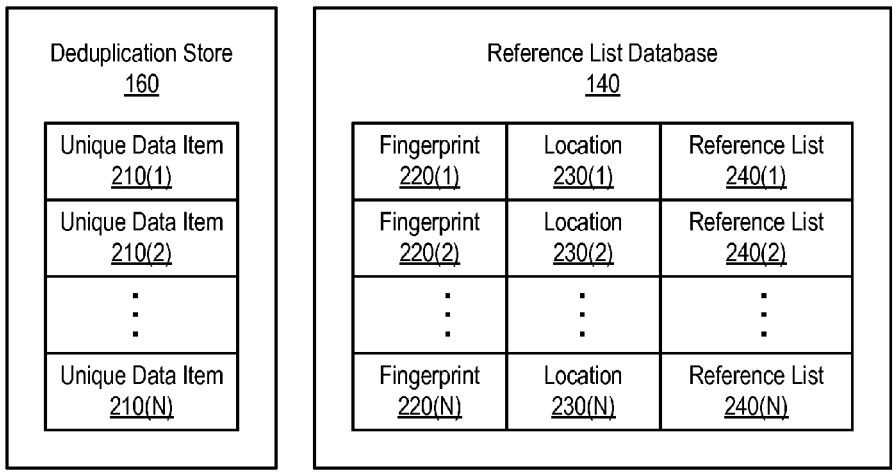
FIG. 2 is a simplified block diagram illustrating components of an example reference list database, according to one embodiment.

FIG. 2 is a simplified block diagram illustrating components of an example reference list database 140. In the embodiment shown, deduplicated data store 160 includes a set of unique data items 210(1)-(N), such as file segments or files, of deduplicated data. The unique data items such as unique data items 210 can be received from one or more of client systems 110. No two unique data items stored within deduplication store 160 should have the same value.

Reference list database 140 provides information about each unique data item 210 stored in deduplication store 160. Reference list database 140 includes a set of database records (also referred to more simply as records), each of which is associated with a unique data item stored in deduplication store 160. In the embodiment shown, each database record includes a fingerprint of a set of fingerprints 220(1)-(N), a location of a set of locations 230(1)-(N), and a reference list of a set of reference lists 240(1)-(N). Each reference list includes a set of reference data objects, discussed further below. Reference list database 140 can be keyed to fingerprints 220, where a fingerprint that identifies a corresponding one of unique data items 210 can be used to uniquely identify a database record in reference list database 140 (which, in turn, corresponds to the unique data item). In such an embodiment, reference list database 140 is sorted by fingerprint (e.g., database records are sorted in increasing order of fingerprint values).

Fingerprint 220 is an identifier of a respective unique data item. For example, in the diagram of FIG. 2, fingerprint 220(1) identifies unique data item 210(1), fingerprint 220(2) identifies unique data item 210(2), and so on. Fingerprint 220 can be a checksum, hash value, or other such value that is calculated based upon data within the unique data (e.g., within a file segment or file). In many embodiments, fingerprints are generated in a manner (e.g., using a cryptographically strong, collision-resistant hash function) that produces the same identifier for identical items of data, while also producing different identifiers for non-identical items of data. Regardless of which particular technique is used to generate fingerprints by a client, the same fingerprint-generation technique is implemented throughout deduplication system 100.

Location 230 is an identifier of a location of a respective unique data item in deduplication store 160 (e.g., an identifier of a container that includes the respective unique data item). For example, location 230(1) indicates the location of unique data item 210(1), location 230(2) indicates the location of unique data item 210(2), and so on. Each fingerprint 220 of a database record is associated with a location 230 of the database record.

Reference list 240 is a running set of the references made to a respective unique data item, where reference list 240 includes one or more reference data objects. Each reference data object stores information about a file that includes (or makes reference to) the respective unique data item. When a unique data item is first stored in deduplication store 160, deduplication engine 130 can be configured to record a transaction object in a transaction log to indicate that a new database record corresponding to the unique data should be added to the reference list database. The transaction object can also indicate that the reference list of the new database record should include a reference data object that stores information about the file that includes the unique data item. The information about the file can be stored in the transaction object (e.g., at the time the transaction object is recorded) and later used to create the reference data object (e.g., at the time the new database record is created). A reference count can be derived from the number of reference data objects in the reference list, where a reference count of one is derived from a single reference data object in the reference list (where the single reference data object indicates that a single file includes the unique data item). An example of such a transaction log will be described in reference to FIG. 4. If deduplication engine 130 encounters a copy of the unique data item that is already stored in deduplication store 160 (e.g., another file also includes the unique data item), the copy is not stored again. In response to a copy being encountered, deduplication engine 130 can be configured to record a transaction object in the transaction log that indicates a new reference data object should be added to the reference list associated with the unique data item, where the new reference data object indicates that another file also includes the unique data item. Thus, adding a reference data object to a reference list effectively increments a corresponding reference count.

When a file that includes the unique data item has expired (e.g., the retention period of the file has expired), deduplication engine 130 records a transaction object in the transaction log that indicates a reference data object corresponding to the file should be removed from the reference list associated with the unique data item (where the removal indicates that the file no longer includes the unique data item). Thus, removing a reference data object from a reference list effectively decrements a corresponding reference count. Deduplication engine 130 can be configured to periodically trigger a garbage collection process (e.g., triggered during queue processing) to evaluate the reference list database for database records that include a reference list without any reference data objects (or has a corresponding reference count of zero), which indicates that no files currently include the corresponding unique data item. During the garbage collection process, deduplication engine can remove the database records that have a zero reference count from the reference list database. Deduplication engine 130 can also remove the unique data item from deduplication store 160. The garbage collection process is discussed in further detail below, with reference to FIG. 6.

Figure 3:
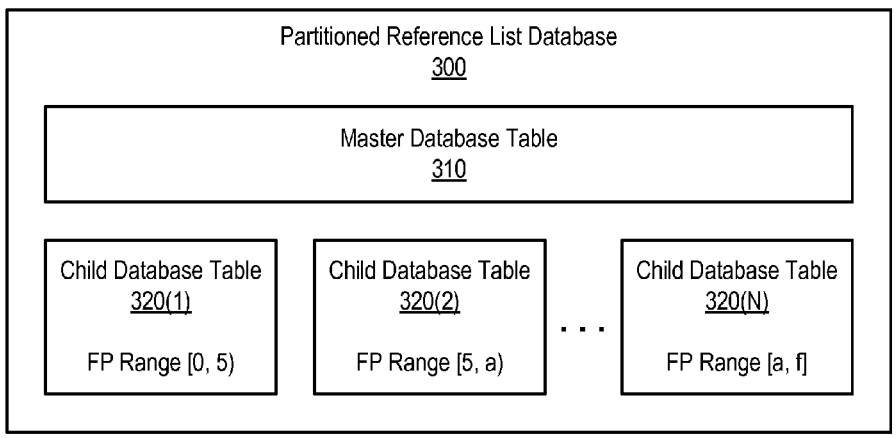
FIG. 3 is a simplified block diagram illustrating components of an example partitioned reference list database, according to one embodiment.

FIG. 3 is a simplified block diagram illustrating components of an example of a partitioned reference list database 300. Partitioning module 150 can be configured to partition reference list database 140 into multiple partitions (or tables) by dividing the set of database records into subsets of database records, where each subset is stored in a table of partitioned reference list database 300. Partitioning module 150 need only partition the reference list database once (e.g., when partitioning module 150 is first implemented on deduplication engine 130). However, a partitioned reference list database can be partitioned additional times (e.g., re-partitioned into a different number of child tables, and/or re-partitioned into child tables that are associated with different fingerprint ranges and database records are shifted to corresponding child tables), such as when a new node is added to the deduplication engine and becomes responsible for storing a portion (e.g., one or more child tables) of the partitioned reference list database, or when balancing workload among the nodes, as discussed below. The partitioned reference list database can then be used during parallel queue processing, as described in further detail below with respect to FIG. 6.

Partitioning module 150 can generate partitioned reference list database 300 by creating a table structure that includes a master database table 310 and multiple child database tables 320(1)-(N). Master database table 310 can include a pointer to each of child database tables 320. Partitioning module 150 can define the tables of partitioned reference list database 300 to use the defined schema of reference list database 140 (e.g., column names and associations). For example, partitioning module 150 can first create master database table 310 that is defined to use the same schema of reference list database 140, and then create child database tables that inherit the schema from the master database table. Like reference list database 140, partitioned reference list database 300 can be keyed to (and sorted by) fingerprints, which can be used to uniquely identify database records in partitioned reference list database 300.

Each child database table 320 can be assigned one or more table constraints, such as a range constraint, based on the criteria. A range constraint limits the values that can be placed in each table. For example, a fingerprint range can be defined for each child database table, where each fingerprint range covers a subset of the total fingerprint space, or all possible values that can be generated using an X number of bits. For example, a 32 bit fingerprint can have a fingerprint space of over 4 billion different values that can be generated. Thus, each child database table 320 can be constrained to include database records that contain a fingerprint value that falls within the fingerprint range of the respective child database table. Fingerprint ranges can be configurable, and thus allow for workload balancing (e.g., to achieve child tables that contain approximately the same number of database records, which is beneficial during data importing, discussed in further detail below). Workload balancing is less of a concern if the fingerprint-generation technique provides fingerprints that are evenly distributed throughout the fingerprint space. While fingerprint ranges are discussed herein, other values or criteria (e.g., other columns of the child database tables) can be used as table constraints.

Additionally, in a multi-node environment where deduplication engine includes multiple nodes (e.g., multiple physical servers), each node of the deduplication engine is responsible for storing a portion of a reference list database, or one or more child database tables, covering a fingerprint range. However, the fingerprint ranges may not be uniformly distributed among the nodes since the fingerprint range is configurable. For example, a node can be responsible for a (larger) database portion that includes a larger range of fingerprint values than the ranges of database portions of other nodes, and thus receives a greater number of transaction objects that correspond to the larger range (as compared to the other nodes). Thus, such a node performs a greater number of database updates (which correspond to the transaction objects) as compared to the other nodes, and has a greater workload than the other nodes. In another example, even if the ranges are evenly distributed, a node can receive a greater number of transaction objects that correspond to a particular fingerprint range as compared to ranges of other nodes. Thus, such a node performs a greater number of database updates (which correspond to the transaction objects) as compared to other nodes, and has a grater workload than the other nodes. In such a multi-node environment, partitioning module 150 is also configured to partition the portion of the reference list database (e.g., one or more child database tables) stored in a high-workload node into additional child tables (as discussed below), to improve queue processing efficiency (e.g., perform parallel database updating on the child database tables).

Partitioning module 150 then divides the database records of reference list database 140 among child database tables 320, where a database record is added to a child database table 320 if the fingerprint of the database record falls within a fingerprint range of the respective child database table 320. In the case of re-partitioning, partitioning module 150 similarly divides the database records of a partitioned reference list database among child database tables 320 of a (new) partitioned reference list database. A fingerprint of a database record from reference list database 140 is compared to a fingerprint range associated with a child table 320. If the fingerprint falls within the interval, the database record is added to the table. Otherwise, the fingerprint is compared with a next fingerprint range associated with the next child table 320 to determine whether the fingerprint falls within the next fingerprint range. The fingerprint is compared with fingerprint ranges until a match with a respective fingerprint range is found (e.g., until a fingerprint range is found in which the fingerprint's value falls). The database record containing the fingerprint is then added to the child table 320 associated with the respective fingerprint range. Since reference list database 140 is already sorted, the database records that are added to child tables 320 will be added in sorted order, meaning the database records in the resulting child tables do not need to be sorted again. Once all database records of reference list database 140 have been added to partitioned reference list database 300, partitioned reference list database 300 replaces reference list database 140.

Thus, each child database table 320 stores a subset of database records of partitioned reference list database 300, where each of the subset of database records includes a fingerprint that falls within the fingerprint range of the respective child database table. In the embodiment shown, child database table 320(1) includes database records that contain fingerprints that fall within a fingerprint range represented by the hexadecimal interval [0, 5), where the values in the interval represent the first four (4) bits (e.g., most significant bits) of a fingerprint. A bracket in the interval indicates an inclusive value in the range, and a parenthesis in the interval indicates an exclusive value not included in the range. Thus, the hexadecimal interval of child database table 320(1) indicates that database records that contain fingerprints starting with a hexadecimal value in the range of zero (0) up to, but not including, five (5) (or in the range of 0 through 4, inclusive), should be included in child database table 320(1). Similarly, child database table 320(2) includes database records that contain fingerprints that start with a hexadecimal number in the range of five (5) to nine (9) (inclusive), and child database table 320(N) includes database records that contain fingerprints that start with a hexadecimal number in the range of a-f (inclusive).

Example pseudocode that can be used to create a partitioned reference list database 300 and add database records from reference list database 140 to partitioned reference list database 300 is provided below, where table "objects" represents master database table 310 and tables "objects_i" represent the one or more child database tables 320. "Range i" can represent one or more fingerprint ranges that "key" (which represents a fingerprint) is compared against, or can represent other range constraints used to constrain the database records added to child tables 320.

CREATE TABLE objects (FP int, location int, ref_count int);
CREATE TABLE objects_i (CHECK(key in range i)) INHERITS (objects);
. . .
INSERT Trigger
Function objects_insert_trigger( )
  IF (NEW.key in range 0) THEN
    INSERT into objects_0 VALUES (NEW.*)
  ELSIF (NEW.key in range 1)
    INSERT into objects_1 VALUES (NEW.*)
  . . .

Figure 4:
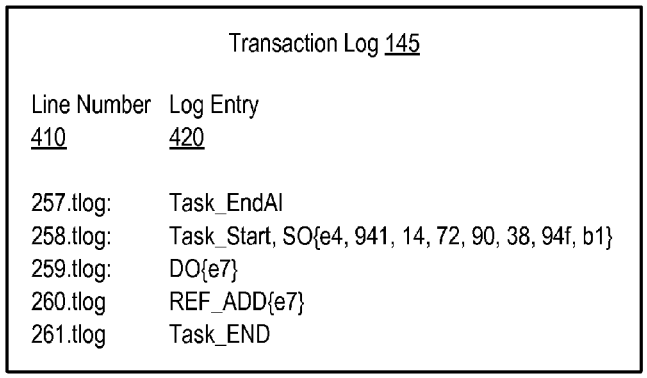
FIG. 4 is a simplified block diagram illustrating components of an example transaction log, according to one embodiment.

CREATE TRIGGER insert_objects_trigger
  BEFORE INSERT ON objects
  FOR EACH ROW EXECUTE PROCEDURE objects_insert_trigger( );

FIG. 4 is a simplified block diagram illustrating components of an example of a transaction log 400. Transaction log 400 (also referred to as a tlog) includes a set of transaction objects contained in a set of log entries 420(1)-(N), where each log entry is identified by a line number 410. Various transactions are recorded by deduplication engine 130 as transaction objects in the transaction log 400 during a deduplication process. A group of transactions can accomplish a task, such as a deduplication job where unique data is in stored deduplication store 160. In the embodiment shown, line 257.tlog includes a statement Task_EndAI that represents an end transaction object, which indicates the end of a task (such as a task described in lines previous to line 257). Line 258.tlog includes a statement Task_Start that represents a start transaction object, which indicates a new deduplication task has started. Line 258.tlog also includes a statement SO{ e4, 941, 14, 72, 90, 38, 94f, b1}, which represents eight (8) instances of another type of transaction object, or segment object. A segment object (SO{fingerprint}) includes information about a segment, such as a fingerprint identifying the segment, where the segment has been added to deduplication store 160 (e.g., the storing of the segment is a transaction). In the embodiment shown, the statement of line 258 represents eight segment objects, one for each of eight (8) file segments, as denoted by the eight fingerprints included within the SO brackets (and thus a given number of fingerprints within SO brackets would indicate a respective number of segment objects). Thus, the eight segment objects indicate that the reference list database 300 should be updated with the information from the segment objects corresponding to the eight file segments (such as by adding database records that include the respective segment fingerprints).

Line 259.tlog includes a statement DO{e7}, which represents another type of transaction object, or data object. A data object (DO{fingerprint}) includes information about a unique data item, such as a fingerprint identifying the unique data item, where the unique data item has been added to deduplication store 160 (e.g., the storing of the unique data item is a transaction). For example, the fingerprint of the data object can be the fingerprint of the entire file (e.g., a backup image file) that includes the eight (8) fingerprints provided in the segment object of line 258. Alternatively, the fingerprint of the data object can be the fingerprint of a file that has been added to deduplication store 160, where deduplication store 160 stores segments and/or files, and where reference list database 300 identifies segments and/or files (e.g., as a unique data item) by fingerprint. In the embodiment shown, the transaction object DO of line 259 indicates that the reference list database 300 should be updated with the information from the data object corresponding to the unique data item (such as by adding a database record that includes the respective fingerprint).

Line 260.tlog includes a statement REF_ADD{e7}, which represents another type of transaction object, or reference addition object. A reference addition object (REF_ADD{fingerprint}) indicates that a reference data object should be added to a reference list corresponding to a unique data item, where the reference data object stores information about a file that includes or refers to the unique data item. In the example where the transaction DO of line 259 represents a file (e.g., a backup image file) that includes the eight (8) segments of line 258, the reference addition object REF_ADD{e7} indicates that a reference data object that includes the fingerprint e7 should be added to the reference list of each database record corresponding to the eight (8)

segments. Further, as discussed above, not all data should be added to deduplication store 160. For data that is duplicative of a unique data item already stored in deduplication store 160 (e.g., another file includes the unique data item already stored in the deduplication store), deduplication engine 130 can record a reference addition object in the transaction log for each additional file that includes the unique data item. Also, although not shown in the transaction log, another type of transaction object can be a reference deletion object (REF_DEL{fingerprint}) that can be recorded by deduplication engine 130 in the transaction log. A reference deletion object indicates that a reference data object (which is identified by the fingerprint included in the REF_DEL transaction object) that stores information about a file that includes the unique data item should be removed from the reference list corresponding to the unique data item. Removal of the reference data object indicates that the unique data item is no longer referred to by the file. Finally, line 261.tlog includes a statement Task_END that represents an end transaction object, which indicates the new deduplication task has ended.

Figures 5A, 5B:
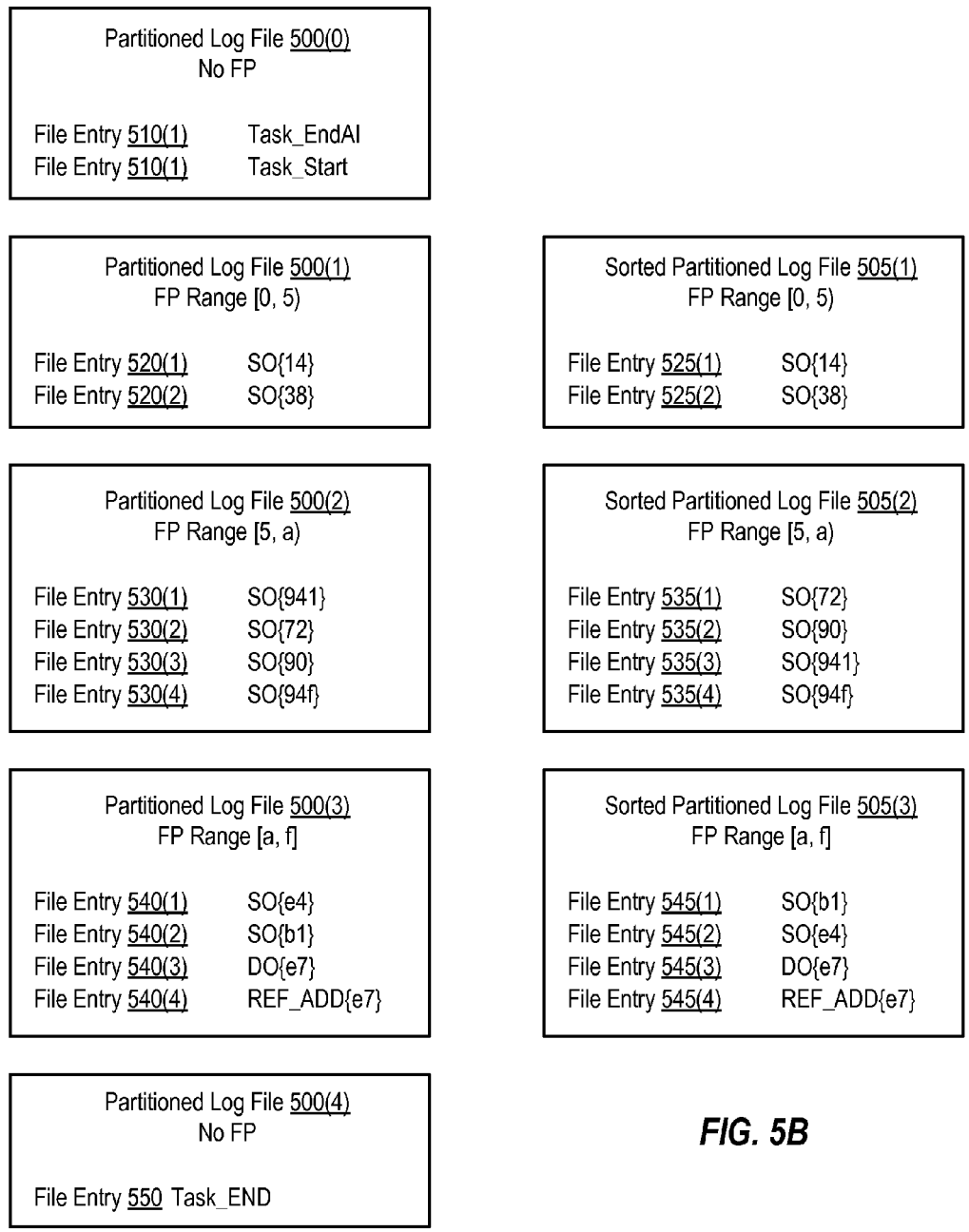
FIGS. 5A and 5B are simplified block diagrams illustrating example partitioned log files, according to one embodiment.

FIG. 5A is a simplified block diagram illustrating components of example partitioned log files 500. Partition module 150 can be configured to partition transaction log 400 into multiple partitioned log files by dividing the set of transaction objects into subsets of transaction objects, where each subset is stored in one of partitioned log files 500. Partitioning module 150 can regularly partition transaction log 400 during scheduled queue processing (e.g., twice a day). Partitioning module 150 can generate the partitioned log files 500 by creating one or more partitioned log files 500.

Partitioning module 150 can traverse through the transaction objects in transaction log 400 and divide the transaction object among partitioned log files 500. Like child tables 320 of partitioned reference list database 300, each partitioned log file 500 can be associated with a criteria range constraint that limits the values that can be placed in each partitioned log file. For example, a fingerprint range can be defined for each partitioned log file, where each fingerprint range covers a subset of the total fingerprint space. Thus, each partitioned log file can be constrained to include transaction objects that contain a fingerprint value that falls within the fingerprint range of the respective partitioned log file. Fingerprint ranges can be configurable for workload balance (e.g., to achieve partitioned log files that contain approximately the same number of transaction objects, which is beneficial during data importing, discussed in further detail below).

For transaction objects that do not include a fingerprint, such as transaction objects that start or end a task, two additional partitioned log files are created. Transaction objects that begin a task can be placed in a first partitioned log file, and transaction objects that end a task can be placed in a last partitioned log file.

The number of partitioned log files associated with a criteria range (e.g., fingerprint range) can depend on a number N of processors (e.g., CPU cores and/or physical servers) included in deduplication engine 130, where the processors can each execute one or more threads. The threads are each responsible for sorting a respective partitioned log file (and, later discussed, for updating child tables of a reference list database), as discussed below. In the embodiment shown, three (N=3) processors are implemented in deduplication engine 130. Thus, N+2 partitioned log files (e.g., N partitioned log files plus the first and last partitioned log files) can be created (or 5 partitioned log files in the embodiment shown in FIG. 5B).

Partitioning module 150 can divide the transaction objects of transaction log 400 among the partitioned log files, using the fingerprint range. A transaction object is added to a partitioned log file 500 if the fingerprint of the transaction object falls within a fingerprint range of the respective partitioned log file. A fingerprint of a transaction object is compared to a fingerprint range associated with a partitioned log file. If the fingerprint falls within the interval, the transaction object is added to the partitioned log file. Otherwise, the fingerprint is compared with a next fingerprint range associated with the next partitioned log file to determine whether the fingerprint falls within the next fingerprint range. The fingerprint is compared with fingerprint ranges until a match with a respective fingerprint range is found (e.g., until a fingerprint range is found in which the fingerprint falls), and the transaction object containing the fingerprint is added to the partitioned log file associated with the respective fingerprint range.

Thus, each partitioned log file stores a subset of transaction objects of transaction log 400, where each subset of transaction objects includes a fingerprint that falls within the fingerprint range of the respective partitioned log file. In the embodiment shown, partitioned log files 500(1), 500(2), and 500(3) each cover different fingerprint ranges of [0, 5), [5, a), and [a-f], respectively, where the values in the intervals represent the first 4 bits (e.g., most significant bits) of a fingerprint. A bracket in the interval indicates an inclusive value in the range, and a parenthesis in the interval indicates an exclusive value not included in the range. Thus, the hexadecimal interval of partitioned log file 500(1) indicates that transaction objects containing fingerprints starting with a hexadecimal value in the range of 0 up to, but not including, 5 (or in the range of 0 through 4, inclusive), should be included in partitioned log file 500(1). Similarly, partitioned log file 500(2) includes transaction objects that contain fingerprints that start with a hexadecimal number in the range of 5 to 9 (inclusive), and partitioned log file 500(3) includes transaction objects that contain fingerprints that start with a hexadecimal number in the range of a-f (inclusive).

FIG. 5B is a simplified block diagram illustrating components of example sorted partitioned log files 505, which are partitioned log files 500 that have been sorted. Since transaction log 400 is not sorted (e.g., transaction objects are added to transaction log 400 as transactions occur), the transaction objects that are added to the child partitioned log files will be out of order. After the transaction objects have been divided among the partitioned log files, the transaction objects in each partitioned log file can be sorted by a respective thread, according to fingerprint (e.g., sorted in increasing order). Since the first and last partitioned log files (e.g., partitioned log files 500(0) and 500(4)) do not include transaction objects with fingerprints, the first and last partitioned log files need not be sorted, and thus do not need to be assigned to a thread.

Partitioning module 150 can start a number of threads (e.g., N threads) and assign each of partitioned log files to a corresponding one of those threads, where the partitioned log files are associated with a range (e.g., a fingerprint range). Each thread sorts the transaction objects in the respective partitioned log file. Once all threads terminate (e.g., finish sorting the respective partitioned log files), sorted partitioned log files 505 can be used to update the partitioned reference list database 300.

Also, time order dependencies of transaction objects must be maintained in order to avoid database record errors during queue processing. For example, in partitioned log file 500(3), file entries 540(3) and 540(4) include transaction objects that share fingerprint e7. DO{e7}, which indicates that a new database record corresponding to fingerprint e7 should be added to the reference list database, needs to be processed before REF_ADD{e7}, which indicates that a reference to the existing database record corresponding to fingerprint e7 should be added to the reference list database (e.g., a reference data object that includes fingerprint e7 should be added to the reference list of one or more existing database records). Thus, before sorting the partitioned log files 500, the threads should first check if any fingerprints are shared by transaction objects within the partitioned log file 500. If a fingerprint is shared among transaction objects, the order of the transaction objects should be maintained through the sorting (e.g., a first transaction object that is located in an entry before a second transaction object should continue to be located in an entry before the second transaction object, even after sorting has been performed).

Figure 6:
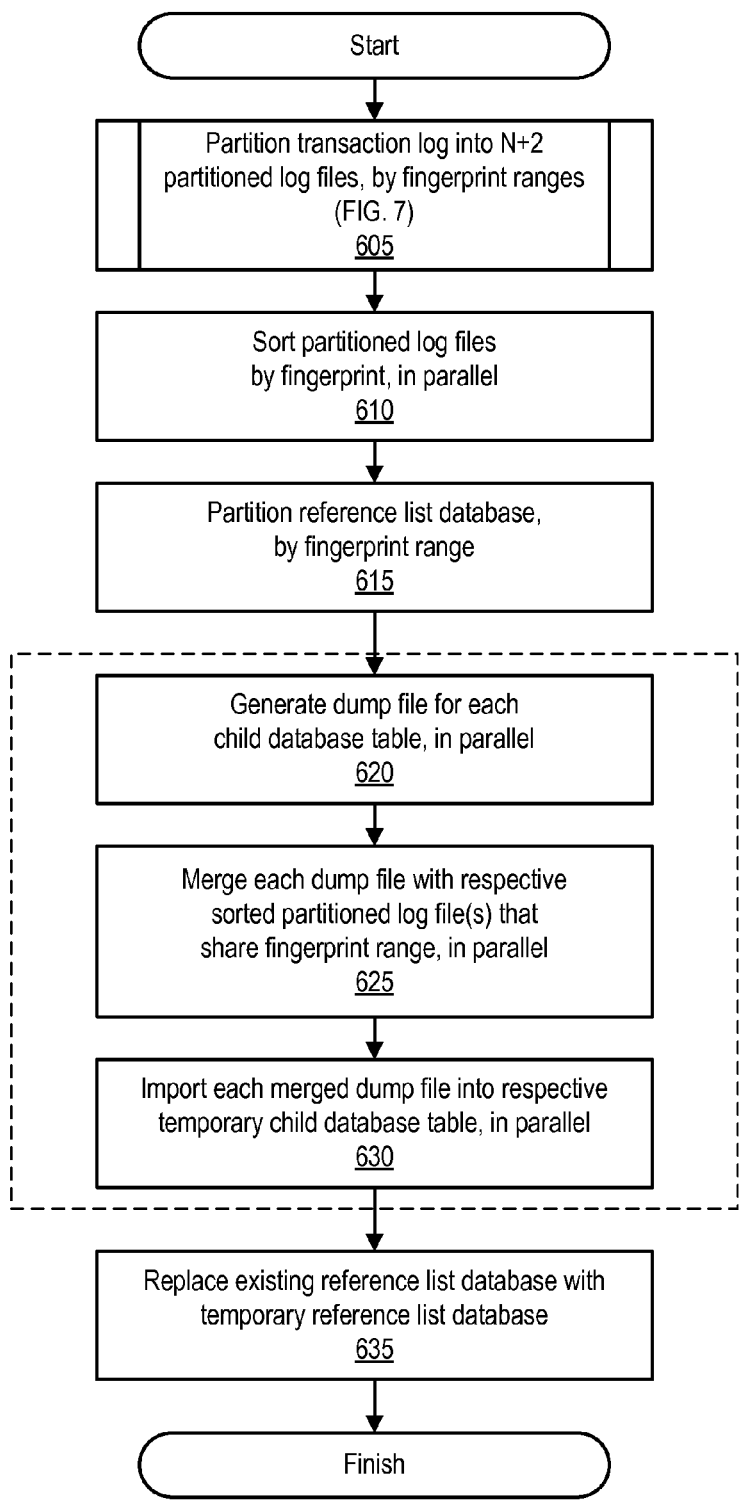
FIG. 6 is a flowchart illustrating an example process implemented by a partitioning module implemented on a deduplication engine, according to one embodiment.

FIG. 6 is a flowchart illustrating an example process implemented by a partitioning module 150 that is implemented on a deduplication engine 130. The process can be executed as part of queue processing to update a reference list database. The process illustrated in FIG. 6 begins at operation 605, where the partitioning module partitions transaction log into N+2 partitioned log files, by fingerprint ranges. The process for partitioning a transaction log is described above in further detail in FIG. 5A, and is described below with respect to FIG. 7.

The process continues to operation 610, where the partitioning module sorts the partitioned log files by fingerprint, in parallel. The partitioning module can start (e.g., instantiate) N threads and can assign each of N partitioned log files (which include transaction objects that involve a fingerprint) to a respective thread. Each thread is configured to sort a respective partitioned log file to produce a respective sorted partitioned log file, where the threads execute in parallel (e.g., the threads are concurrently executed). Parallel sorting is also described above in further detail with respect to FIG. 5B.

The process continues to operation 615, where the partitioning module partitions the reference list database, by fingerprint. As described above, a reference list database need only be partitioned once, such as when the partitioning module is first implemented on the deduplication engine. Thus, once the reference list database is partitioned, operation 615 can be skipped in future iterations of the process of FIG. 6. However, the reference list database can be additionally partitioned, as needed (as also described above). The reference list database discussed below is a partitioned reference list database. Partitioning the reference list database is described above in further detail with respect to FIG. 3.

The process continues to operation 620, generating a dump file for each child database table, in parallel. Operations 620 through 630 are part of a reference list database update sub-process that occurs during queue processing, as indicated by the dotted line in FIG. 6. Rather than sequentially processing an entire transaction log against an entire (un-partitioned) reference list database, the partitioning module instead will update a (partitioned) reference list database in parallel by processing each sorted partitioned log file against a respective child table of the partitioned reference list database. In order to avoid taking the entire reference list database offline to update live child tables, dump files of the live child tables and temporary child tables can be used to perform the updating sub-process. The partitioning module first starts a number of threads and assigns each of the (live) child tables of the reference list database to a respective thread. The number of threads used in the reference list database updating need not equal the number of threads used to sort the partitioned log files.

As part of the updating sub-process, once each live child table is assigned to a respective thread, each thread generates a dump file for the respective live child table, where the threads execute concurrently, or in parallel. In certain embodiments, a dump file contains database data (e.g., database records) without the database structure. A dump file can be a flat file, a text file, or other type of file that includes each database record on a respective line of the text file, with fields in each record separated by a delimiter of some sort (e.g., commas, spaces, tabs, or the like). Dump files are used in order to perform the updating in order to avoid taking the entire reference list database offline in order to update the live child tables. The live child tables can be locked or frozen during the generating, in order to prevent consistency errors.

The process continues to operation 625, where the partitioning module merges a respective dump file with one or more respective sorted partitioned log files that share at least a portion of the same fingerprint range associated with the respective dump file, in parallel. Partitioning module first assigns each of the sorted partitioned log files to a respective thread, where each respective thread is assigned one or more sorted partitioned log files that cover the same fingerprint range as the child table already assigned to the respective thread (e.g., the child table assigned during operation 620). For example, a thread that has been assigned child database table 310(1), which is associated with a fingerprint range [0, 5), will be assigned sorted partitioned log file 505(1), which is also associated with a fingerprint range [0, 5). In another example, a thread that has been assigned child database table 310(1), which is associated with fingerprint range [0, 5), will be assigned two (or more) sorted partitioned log files that share at least a portion of the same fingerprint range, where one log file covers fingerprint range [0, 2) and another log file covers fingerprint range [2, 5).

Each thread then merges a respective dump file with a respective sorted partitioned log file(s) to produce a respective merged dump file, where the threads are concurrently executed (e.g., executed in parallel). A thread merges a respective sorted partitioned log file with a respective dump file by updating the dump file with information included in transaction objects of the respective sorted partitioned log file. A thread traverses (e.g., steps through) each transaction object in a respective sorted partitioned log file, which can include segment objects, data objects, reference addition objects, and reference deletion objects. As the thread traverses the respective sorted partitioned log file, the thread also traverses a respective dump file to process the transaction objects against the respective dump file. Thus, for each transaction object, the thread can traverse the respective dump file to insert a new database record that corresponds to a transaction object, or to update an existing database record that corresponds to a transaction object.

For example, in processing a segment object or a data object, a thread extracts information (e.g., fingerprint, location, and reference list) from the segment object or the data object, where the information describes a unique data item that has been added to deduplication store. The thread then generates a database record containing the information (e.g., transaction object information is reorganized in, or reformatted to, the generated database record, according to the schema of the reference list database) in order to add the information to the respective dump file. The thread traverses rows of the respective dump file and adds the generated database record to the respective dump file. The thread writes the generated database record to a line or row that is inserted into the respective dump file according to fingerprint order (e.g., the fingerprint of the generated database record falls between a first and second fingerprint of first and second rows in the dump file, thus resulting in the generated database record being inserted between the first and second rows). Accordingly, queue processing efficiency is improved by inserting new database records to the dump file in sorted order, as compared to appending database records to the end of the dump file and sorting the records of the dump file by fingerprint after the merge is complete (e.g., less time is needed to complete X number of writes as compared to the time to complete X number of writes plus sorting).

For example, in processing a reference addition object (REF_ADD) or reference deletion object (REF_DEL), a thread extracts information from the reference addition object or the reference deletion object, where the information describes a unique data item that is already stored in deduplication store. As discussed above, a reference addition object can indicate that a reference data object associated with the unique data item should be added to a reference list of a database record associated with the unique data item. A reference deletion object can indicate that a reference data object associated with a unique data item should be removed from a reference list of a database record associated with the unique data item. The thread then traverses rows of the respective dump file and increments or decrements a reference count of an existing database record (e.g., row) that corresponds to the transaction object (e.g., the existing database record includes a fingerprint that is included in the reference addition object or reference deletion object). Accordingly, queue processing efficiency is improved by updating existing database records of the dump file with transaction objects that are in sorted order in a sorted partitioned log file, as compared to traversing the dump file for each transaction object that is not in sorted order (e.g., less time is needed to traverse X rows of the entire dump file once as compared to the time to traverse up to X rows for each transaction object in unsorted order).

Although not shown, garbage collection can also be performed at this time. As a thread steps through the dump file, the thread can be configured to evaluate the database records (e.g., rows) in the dump file that contain a reference list without any reference data objects (e.g., has a reference count of zero). The evaluation occurs after a reference deletion object and/or reference addition object for the row has been processed. When a reference count of a database record is zero (and thus indicates that no files currently include the unique data item associated with the database record), the thread can remove the database record (or delete the row) from the dump file. Deduplication engine (via another process) can also remove the associated unique data item from the deduplication store.

The process continues to operation 630, where the partitioning module imports each merged dump file into a respective temporary child table, in parallel. Partitioning module first generates a temporary reference list database that mimics the structure of the existing reference list database (e.g., a temporary master database table and a same number of temporary child database tables that are constrained similarly to the existing child database tables). Partitioning module then assigns each temporary child table to a respective thread, where the respective thread is assigned a temporary child table that corresponds to the existing child table already assigned to the respective thread (e.g., the child table assigned during operation 620). Each thread imports the respective merged dump file (e.g., the merged dump file generated in operation 625) into the respective temporary child table, where the threads are concurrently executed (e.g., execute in parallel). The threads can use a database import tool, such as a copy function, to import the respective merged dump file to a corresponding temporary child table. Although not shown, indexing of the temporary child tables can also be performed at this time.

Example pseudocode that can be used to create temporary tables of a temporary reference list database, import the dump file into the temporary child tables, and create an index for the temporary child tables is provided below, where table "objects2" represents the temporary master database table and tables "objects2_i" represent the one or more temporary child database tables.

CREATE TABLE objects2 (FP int, location int, ref_count int);
CREATE TABLE objects2_i (CHECK(key in range i)) INHERITS (objects);
COPY dump file into objects2_i;
CREATE UNIQUE INDEX idx_object2_i ON objects2_i;

The process continues to operation 635, where partitioning module replaces the existing (live) reference list database with the temporary reference list database. For example, partitioning module can drop (e.g., delete) the existing reference list database tables (e.g., live master table and live child tables) and can rename the temporary database tables (e.g., the temporary master database table and temporary child database tables) with the name of (what was) the existing reference list database. The process then ends.

Figure 7B:
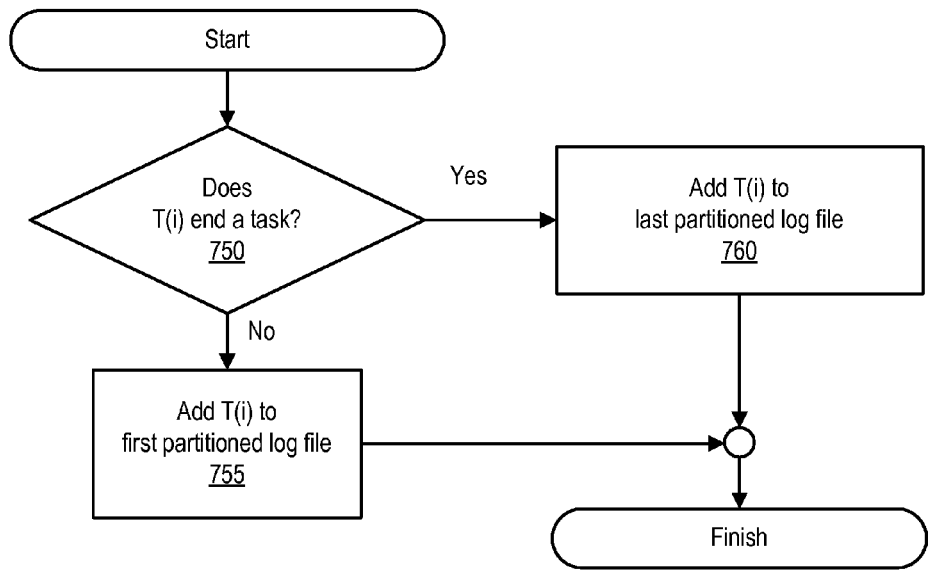
Figure 7C:
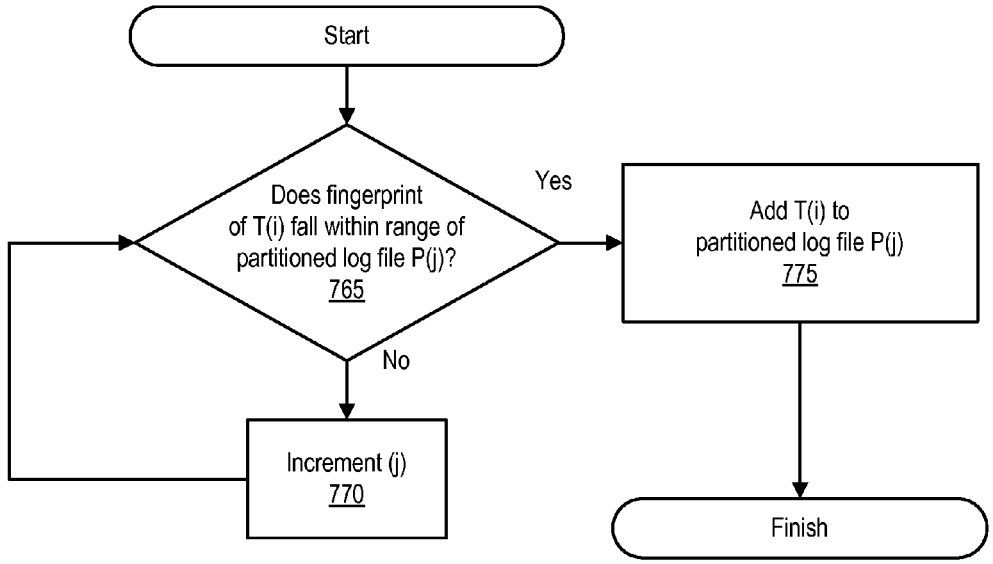

FIGS. 7A, 7B, and 7C are flowcharts illustrating an example transaction log partitioning process implemented by a partitioning module implemented on deduplication engine. The process can be executed as part of queue processing to update a reference list database. Partition module can be configured to partition transaction log into multiple partitioned log files by dividing a set of transaction objects in the transaction log into subsets of transaction objects, where each subset is stored in one of the partitioned log files.

The process illustrated in FIG. 7A begins at operation 705, where partitioning module opens or creates N+2 partitioned log files. As discussed above with respect to FIG. 5B, N+2 partitioned log files can be created, where N is the number of threads that can be implemented and two (2) additional partitioned log files will be used to contain transaction objects that do not include a fingerprint.

The process continues to operation 710, where partitioning module opens the transaction log, which contains the transaction objects that will be divided among the partitioned log files. The process continues to operation 715, where partitioning module reads a transaction object T(i) of the transaction log. Operation 715 begins a sequence of operations that can be repeated for each transaction object in the transaction log. For example, in the embodiment shown in FIG. 4, transaction log 400 includes an entry at line 258 that includes a statement that represents eight (8) segment objects, one for each of the 8 segments. The partitioning module can walk through each through each segment object of line 258 during operations 715 through 740.

A present iteration of the sequence is indicated by the letter i, which can be initialized to one (thus starting the sequence at a first transaction object in the transaction log) when the transaction log partitioning process is initiated. At the end of the sequence, the letter i is incremented (e.g., operation 740), indicating that a next transaction object of the transaction log can be processed (if there is another transaction object to process).

The process continues to operation 720, where partitioning module determines whether transaction object T(i) include a fingerprint, where inclusion of a fingerprint indicates that transaction object T(i) should be processed against the reference list database. If transaction object T(i) does not include a fingerprint (e.g., the transaction object T(i) starts or stops a task), the process continues to operation 725, where partitioning module adds T(i) to one of the first and last partitioned log files. The operations performed according to one embodiment of adding T(i) in this manner are described in further detail in FIG. 7B.

Returning to operation 720, if transaction object T(i) includes a fingerprint, the process continues to operation 730, where partitioning module adds T(i) to one of the partitioned log files P(1) through P(N), based on fingerprint. The operations performed according to one embodiment of adding T(i) in this manner is described in further detail in FIG. 7C.

From operations 725 and 730, the process continues to operation 735, where the partitioning module determines if another transaction object is in the transaction log. If another transaction object is in the transaction log, the letter i is incremented in operation 740 and the process returns to operation 715, where the next transaction object T(i) is read. If another transaction object is not in the transaction log, the process continues to operation 745, where partitioning module closes the partitioned log files and the transaction log. The process then ends.

FIG. 7B illustrates a sub-process that adds transaction objects that do not include a fingerprint to one of the first and last partitioned log files. The process of 7B begins at operation 750, where partitioning module determines whether T(i) ends a task. If T(i) ends a task, the process continues to operation 760, where partitioning module adds T(i) to the last partitioned log file, and the process ends. If T(i) does not end a task, the process continues to operation 755, where partitioning module adds T(i) to the first partitioned log file, and the process ends.

FIG. 7C illustrates a sub-process that adds transaction objects that include a fingerprint to one of the partitioned log files. The process of FIG. 7C begins at operation 765, where partitioning module determines whether the fingerprint of T(i) falls within a range of a partitioned log file P(j). Operation 765 begins a sequence of operations that iterate through the partitioned log files and compares the fingerprint of T(i) with a fingerprint range associated with each partitioned log file. A present iteration of the sequence is indicated by the letter j, which can be initialized to one (thus starting the sequence with a first partitioned log file) when the sub-process is initiated. Each transaction object is added to one of the partitioned log files P(1) through P(N).

If the fingerprint of T(i) does not fall within the range of partitioned log file P(j), the process continues to operation 770, where j is incremented, and then returns to operation 765 to evaluate the fingerprint against the range of the next partitioned log file P(j). If the fingerprint of T(i) does fall within the range of partitioned log file P(j), the process continues to operation 775, where partitioning module adds T(i) to partitioned log file P(j). The process then ends.

Figure 8:
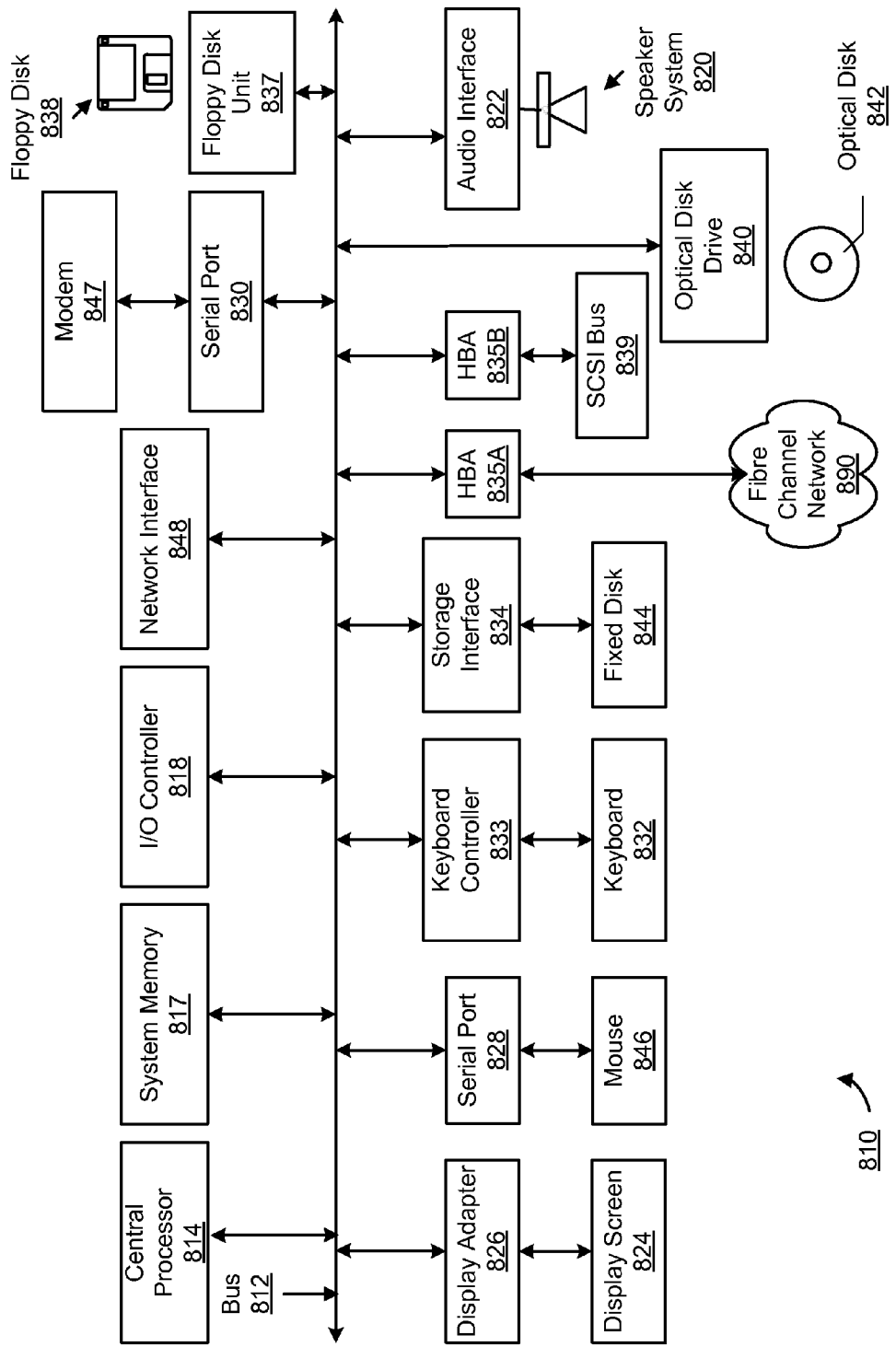
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in the deduplication system 100, such as system(s) 110 and/or 130, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for performing operations (e.g., for automatically performing operations) on such applications based on their dependencies on other applications (such as described above with reference to the processes of FIG. 6-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
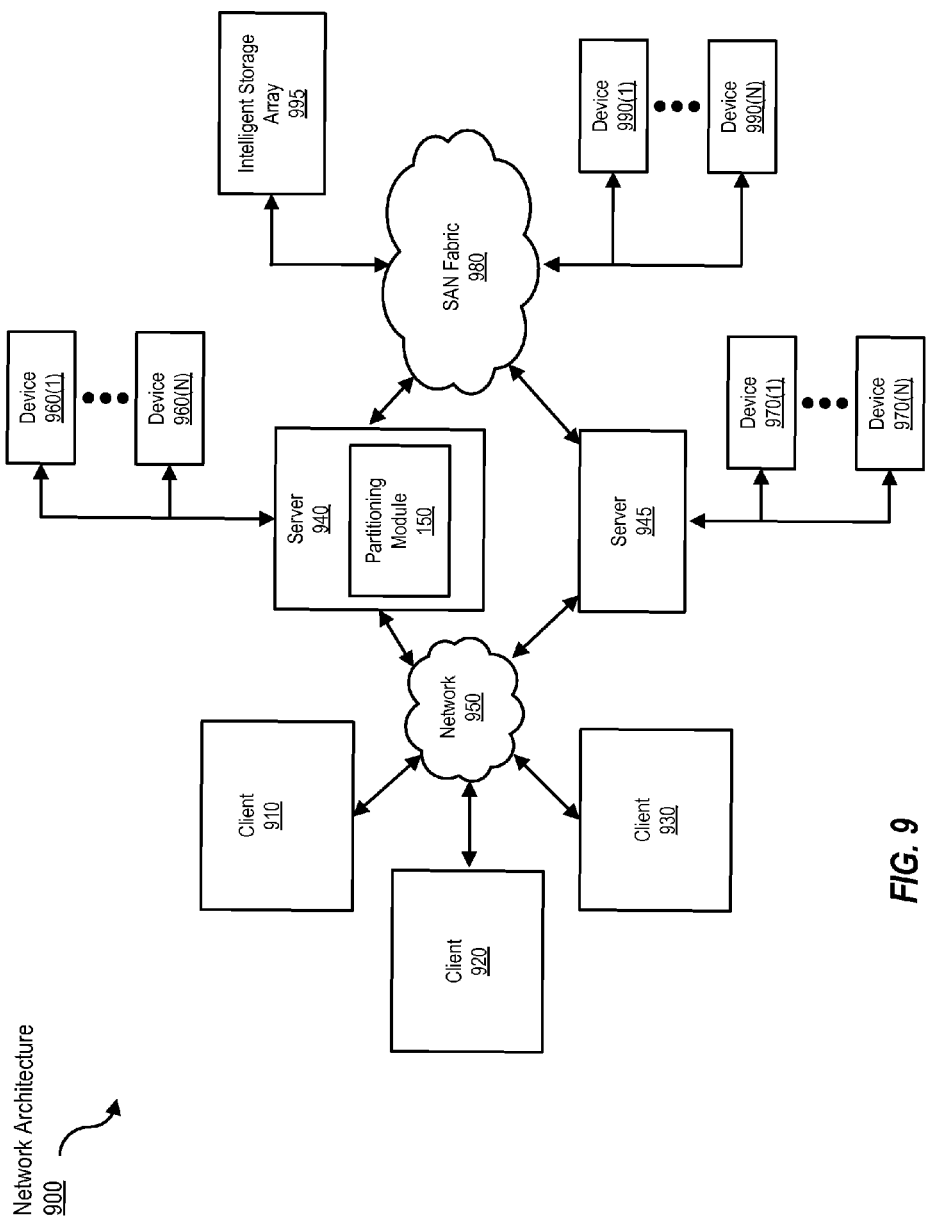
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as deduplication engine 130 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, servers 940 and/or 945 can include a partitioning module 150, as shown in FIG. 1.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a partitioning module 150 in FIG. 1 can transform information received from a client system into data stored in a deduplication store and/or into data stored in a reference list database.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method, using one or more processors and a non-transient computer-readable storage medium, comprising:
   partitioning a transaction log into a plurality of partitioned log files, wherein
      the transaction log comprises a plurality of transaction objects, wherein
         each of the transaction objects comprises a unique hash value, and
         each of the unique hash values is based, at least in part, on information in a corresponding one of the transaction objects;
      the partitioning the transaction log comprises
         dividing the plurality of transaction objects into the plurality of partitioned log files, wherein
            each of the plurality of partitioned log files is associated with a hash-value-based range constraint among a plurality of hash-value-based range constraints,
            for each of the transaction objects to be partitioned, the dividing uses the unique hash value of said transaction object to allocate said transaction object to a corresponding partitioned log file of the plurality of partitioned log files, wherein
               the corresponding partitioned log file is associated with the hash-value-based range constraint that comprises the unique hash value of said transaction object, and as a result of the dividing, each of the plurality of partitioned log files comprises a subset of the plurality of transaction objects; and sorting each of the plurality of partitioned log files, wherein
the plurality of partitioned log files are sorted concurrently, and
the sorting produces a plurality of sorted partitioned log files.

2. The method of claim 1, wherein
each of the transaction objects further comprises information about corresponding deduplicated data, and
the corresponding deduplicated data is stored in a deduplication store.

3. The method of claim 1, further comprising:
updating a plurality of tables, wherein
the plurality of tables are updated concurrently, and
the updating uses the plurality of sorted partitioned log files.

4. The method of claim 3, wherein the dividing the plurality of transaction objects further comprises:
comparing a first hash value of a first transaction object with a first hash value range associated with a first partitioned log file; and
storing the first transaction object in the first partitioned log file, in response to a determination that the first hash value falls within the first hash value range.

5. The method of claim 1, wherein:
a number of hash-value-based range constraints among the plurality of hash-value-based range constraints does not exceed a number of CPU cores among a plurality of CPU cores, wherein
each CPU core is operably coupled to one or more processors; and
the sorting further comprises
assigning each of the plurality of partitioned log files to a respective thread of a plurality of threads, wherein
each of the plurality of threads is assigned to a separate CPU core among the plurality of CPU cores; and
concurrently sorting, by the respective thread, each of the plurality of partitioned log files.

6. The method of claim 3, wherein
a reference list database comprises a plurality of tables,
the reference list database comprises information about deduplicated data stored in a deduplication store, and
each of the plurality of tables comprises a subset of the information.

7. The method of claim 3, wherein the updating the plurality of tables further comprises:
assigning a respective table of the plurality of tables to a respective thread of a plurality of threads;
assigning a respective sorted partitioned log file of the plurality of sorted partitioned log files to the respective thread, wherein
the respective sorted partitioned log file shares at least a portion of a first hash-value-based range constraint associated with the respective table, wherein
the first hash-value-based range constraint is one of the plurality of hash-value-based range constraints; and
concurrently processing, by the respective thread, the respective sorted partitioned log file against the respective table.

8. The method of claim 7, wherein the concurrently processing the respective sorted partitioned log file comprises:
generating a respective dump file for the respective table;

merging the respective sorted partitioned log file with the respective dump file to produce a respective merged dump file; and
importing the respective merged dump file into a temporary table.

9. The method of claim 3, wherein the updating the plurality of tables comprises:
updating a plurality of temporary tables in parallel; and
replacing the plurality of tables with the plurality of temporary tables.

10. A non-transitory computer readable storage medium configured to store program instructions that, when executed on a processor, are configured to cause the processor to perform a method comprising:
partitioning a transaction log into a plurality of partitioned log files, wherein
the transaction log comprises a plurality of transaction objects, wherein
each of the transaction objects comprises a unique hash value, and
each of the unique hash values is based, at least in part, on information in a corresponding one of the transaction objects;
the partitioning the transaction log comprises
dividing the plurality of transaction objects into the plurality of partitioned log files, wherein
each of the plurality of partitioned log files is associated with a hash-value-based range constraint among a plurality of hash-value-based range constraints,
for each of the transaction objects to be partitioned, the dividing uses the unique hash value of said transaction object to allocate said transaction object to a corresponding partitioned log file of the plurality of partitioned log files, wherein
the corresponding partitioned log file is associated with the hash-value-based range constraint that comprises the unique hash value of said transaction object, and
as a result of the dividing, each of the plurality of partitioned log files comprises a subset of the plurality of transaction objects; and
sorting each of the plurality of partitioned log files in parallel, wherein
the plurality of partitioned log files are sorted concurrently, and
the sorting produces a plurality of sorted partitioned log files.

11. The non-transitory computer readable storage medium of claim 10, wherein
each of the transaction objects further comprises information about corresponding deduplicated data, and
the corresponding deduplicated data is stored in a deduplication store.

12. The non-transitory computer readable storage medium of claim 10, wherein the method performed by the processor further comprises:
updating a plurality of tables, wherein
the plurality of tables are updated concurrently, and
the updating uses the plurality of sorted partitioned log files.

13. The non-transitory computer readable storage medium of claim 11, wherein the dividing the plurality of transaction objects further comprises:
comparing a first hash value of a first transaction object with a first hash value range associated with a first partitioned log file; and storing the first transaction object in the first partitioned log file, in response to a determination that the first hash value falls within the first hash value range.

14. The non-transitory computer readable storage medium of claim 10, wherein
a number of hash-value-based range constraints among the plurality of hash-value-based range constraints does not exceed a number of CPU cores among a plurality of CPU cores, wherein each CPU core is operably coupled to one or more processors; and
the sorting further comprises
assigning each of the plurality of partitioned log files to a respective thread of a plurality of threads, wherein each of the plurality of threads is assigned to a separate CPU core among the plurality of CPU cores; and
concurrently sorting, by the respective thread, each of the plurality of partitioned log files.

15. The non-transitory computer readable storage medium of claim 12, wherein
a reference list database comprises the plurality of tables, the reference list database comprises information about deduplicated data stored in a deduplication store, and
each of the plurality of tables comprises a subset of the information.

16. The non-transitory computer readable storage medium of claim 10, wherein the updating the plurality of tables further comprises:
assigning a respective table of the plurality of tables to a respective thread of a plurality of threads;
assigning a respective sorted partitioned log file of the plurality of sorted partitioned log files to the respective thread, wherein
the respective sorted partitioned log file shares at least a portion of a first hash-value-based range constraint associated with the respective table; and
concurrently processing, by the respective thread, the respective sorted partitioned log file against the respective table.

17. The non-transitory computer readable storage medium of claim 16, wherein the concurrently processing the respective sorted partitioned log file comprises:
generating a respective dump file for the respective table;
merging the respective sorted partitioned log file with the respective dump file to produce a respective merged dump file; and
importing the respective merged dump file into a temporary table.

18. The non-transitory computer readable storage medium of claim 12, wherein the updating the plurality of tables comprises:

updating a plurality of temporary tables in parallel; and
replacing the plurality of tables with the plurality of temporary tables.

19. An apparatus comprising:
a partitioning module comprising:
means to partition a transaction log into a plurality of partitioned log files, wherein
the transaction log comprises a plurality of transaction objects, wherein
each of the transaction objects comprises a unique hash value, and
each of the unique hash values is based, at least in part, on information in a corresponding one of the transaction objects;
the means to partition the transaction log comprises
means for dividing the plurality of transaction objects into the plurality of partitioned log files, wherein
each of the plurality of partitioned log files is associated with a hash-value-based range constraint among a plurality of hash-value-based range constraints,
for each of the transaction objects to be partitioned, the means for dividing uses the unique hash value of said transaction object to allocate said transaction object to a corresponding partitioned log file of the plurality of partitioned log files, wherein
the corresponding partitioned log file is associated with the hash-value-based range constraint that comprises the unique hash value of said transaction object, and
each of the plurality of partitioned log files comprises a subset of the plurality of transaction objects, as a result of the dividing; and
means to generate a plurality of sorted partitioned log files, wherein
the means to generate further comprises
means to sort each of the plurality of partitioned log files, wherein
the plurality of partitioned log files are sorted concurrently, and
the means to sort produces a plurality of sorted partitioned log files.

20. The apparatus of claim 19, wherein
each of the transaction objects further comprises information about corresponding deduplicated data, and
the corresponding deduplicated data is stored in a deduplication store.

* * * * *